(12) United States Patent
Bonadeo et al.

(10) Patent No.: US 10,197,387 B2
(45) Date of Patent: Feb. 5, 2019

(54) MEASURING DEVICE FOR THREAD PARAMETERS FOR THREADED JOINTS

(71) Applicant: TENARIS CONNECTIONS B.V., Amsterdam (NL)

(72) Inventors: Nicolas Hernan Bonadeo, Buenos Aires (AR); Sebastian Berra, Buenos Aires (AR); Javier Ignacio Etcheverry, Buenos Aires (AR)

(73) Assignee: TENARIS CONNECTIONS B.V., Amsterdam (NL)

( * ) Notice: Subject to any disclaimer, the term of this patent is extended or adjusted under 35 U.S.C. 154(b) by 1092 days.

(21) Appl. No.: 14/506,443

(22) Filed: Oct. 3, 2014

(65) Prior Publication Data

US 2015/0022823 A1  Jan. 22, 2015

Related U.S. Application Data

(62) Division of application No. 13/151,235, filed on Jun. 1, 2011, now Pat. No. 8,855,965.

(30) Foreign Application Priority Data

Jun. 1, 2010 (EP) ..................................... 10164637

(51) Int. Cl.
G01B 11/24 (2006.01)
(52) U.S. Cl.
CPC ................................ *G01B 11/2425* (2013.01)
(58) Field of Classification Search
None
See application file for complete search history.

(56) References Cited

U.S. PATENT DOCUMENTS

| 3,489,437 A | 1/1970 | Duret |
| 4,315,688 A * | 2/1982 | Pryor ..................... G01B 11/22 356/237.1 |

(Continued)

FOREIGN PATENT DOCUMENTS

| GB | 1 398 214 | 6/1973 |
| GB | 1 428 433 | 3/1976 |

(Continued)

OTHER PUBLICATIONS

Albion Devices, Inc., "Why Compensate for Temperature?" Albion Devices, Inc., Feb. 2004.

(Continued)

*Primary Examiner* — Alexander Satanovsky
*Assistant Examiner* — Lina M Cordero
(74) *Attorney, Agent, or Firm* — Knobbe Martens Olson and Bear LLP

(57) ABSTRACT

Thread parameters for a threaded object are determined. Spatial reference systems (X, Y, Z) and (X', Y', Z') are respectively identified for a position sensor and the threaded object. A transformation matrix describing a quadratic form representing the threaded object in (X, Y, Z) may be determined to relate the reference systems. For example, a sensor trajectory on the threaded object may be determined, along with measurement points on the threaded object. The measurement points may be selected so the matrix, evaluated on these values, has maximum rank. Position data at measurement points in the second reference system may be transformed into the first reference system, yielding first results. After coating the threaded object, position data at the measurement points may be acquired again and transformed into the first reference system, yielding second results. Comparisons between the first and second results may provide thickness of the coating and quality verification.

17 Claims, 12 Drawing Sheets

(56) References Cited

U.S. PATENT DOCUMENTS

| | | | |
|---|---|---|---|
| 4,644,394 A | 2/1987 | Reeves | |
| 5,136,157 A | 8/1992 | Apter et al. | |
| 5,137,310 A | 8/1992 | Noel et al. | |
| 5,260,780 A | 11/1993 | Staudt, III | |
| 5,383,021 A * | 1/1995 | Hanna | G01B 11/2425 250/559.26 |
| 5,521,707 A | 5/1996 | Castore et al. | |
| 5,712,706 A | 1/1998 | Castore et al. | |
| 5,871,391 A | 2/1999 | Pryor | |
| 7,310,890 B2 | 12/2007 | Cattaneo et al. | |
| 8,682,465 B2 * | 3/2014 | Bonadeo | G01B 11/2425 356/608 |
| 8,744,160 B2 * | 6/2014 | Bonadeo | G01B 11/0616 378/9 |
| 8,855,965 B2 * | 10/2014 | Bonadeo | G01B 11/2425 702/150 |
| 2005/0134838 A1 | 6/2005 | Hartmann et al. | |
| 2006/0261294 A1 * | 11/2006 | Johnson | G01B 11/2425 250/559.42 |
| 2007/0002315 A1 * | 1/2007 | Ban | G01B 11/2425 356/237.1 |
| 2007/0119066 A1 * | 5/2007 | Cattaneo | G01B 11/08 33/550 |
| 2008/0158905 A1 | 7/2008 | Chuang et al. | |
| 2009/0033087 A1 | 2/2009 | Carcagno et al. | |
| 2009/0102107 A1 * | 4/2009 | Kolodge | G01B 11/2425 269/13 |
| 2010/0110448 A1 | 5/2010 | Johnson | |
| 2010/0270484 A1 * | 10/2010 | Johnson | G01B 11/2425 250/559.4 |
| 2011/0084483 A1 | 4/2011 | Nunez | |
| 2011/0238199 A1 | 9/2011 | Bonadeo | |
| 2011/0293169 A1 | 12/2011 | Bonadeo | |
| 2011/0295550 A1 | 12/2011 | Bonadeo | |

FOREIGN PATENT DOCUMENTS

| | | |
|---|---|---|
| WO | WO 2004/033951 | 4/2004 |
| WO | WO 2007/063079 | 6/2007 |
| WO | WO 2008/090411 | 7/2008 |
| WO | WO 2010/063792 | 6/2010 |

OTHER PUBLICATIONS

International Preliminary Report on Patentability in corresponding International Application No. PCT/EP2009/066309, dated Jun. 7, 2011.

International Search Report, dated Feb. 9, 2010 in PCT Application No. PCT/EP2009/066309, 3 pages.

International Written Opinion, dated Feb. 9, 2010 in PCT Application No. PCT/EP2009/066309, 3 pages.

Machine Design, "Lasers Gauge Pitch", Machine Design, Penton Media, USA, vol. 67, No. 19, p. 40, Oct. 26, 1995.

* cited by examiner

MEASURING DEVICE FOR THREAD PARAMETERS FOR THREADED JOINTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the present disclosure relate to a measuring device and, in particular, to a measuring device for non-destructive measurement of geometrical parameters of threaded joints. Applications may include, but are not limited to, joints for pipes used in the hydrocarbon industry.

Description of the Related Art

In manufacturing processes for threaded objects such as screws, bolts, and threaded pipes, it is beneficial to verify that the geometrical dimensions of the threaded object comply with tolerances set for the object. In addition, information on the nature of the deviation from these tolerances can be used as a feedback to the manufacturing process, thus avoiding rejection of a threaded object later on in the process.

When performing measurement operations for quality control on non-coated threaded objects, difficulties may be encountered. For example, precision and repeatability of measurements are often difficult to achieve. In the past, there have been attempts to improve the accuracy and repeatability of the measurement operations and to make measurement systems capable of measuring the complex thread shape of threaded objects such as the pipes used in the oil industry. In this technical field, a need is felt to measure several parameters, such as taper of the pin and box, thread pitch, thread height, pin or box diameter, pipe ovality, and run in and run out.

In cases where the pipe threading is also coated (e.g. with a dry lubricant), additional difficulties may be encountered. As in the case of non coated pipes, it is beneficial to ensure and verify the geometrical dimensions of the finished piece after the coating process is finished, in order to comply with the tolerances set for the final object.

While ensuring precision and repeatability of measurements remains a difficulty in the case of coated, threaded objects, other problems may also be encountered. For example, when the joints are coated measurement devices are not capable of ensuring that the coating material is not damaged during measurement procedure due to factors such as handling of the pipes and to the use of contact type measuring devices.

Some measuring systems have been proposed for measuring tubular products, with or without coating applied on their surface. However, none of these techniques is especially adapted for measuring threaded joints or, especially the threaded parts of tubular joints that are coated.

In one example, a measurement technique using ultrasound is known, however, this technique has the drawback that it cannot be applied to threaded objects with coatings having small thicknesses as those applied in threaded joints for the hydrocarbon industry. The wavelength of the ultrasound is much larger than the thicknesses to be measured.

In another example, measurement techniques are known that employ eddy currents. However, this technique has the disadvantage that the measurement device must be placed either in contact or very close to the work piece. It is difficult to use this technique on threaded parts of a joint because of the complex geometry of these parts and because boundary effects are generated when eddy currents are generated on those surfaces. The deformation of the current field lines caused by the geometry, and the fact that the sensor must be very near to the thread surface, are two important constraints that make these devices unsuitable to measurement of pipe threads.

In a further example, measurement techniques are know which are based on X-ray fluorescence or back scattering. In this technique, the coating highlights when it is irradiated and the fluorescence is reabsorbed by the coating. Thus, the amount of fluorescence measured is proportional to the thickness. The results are influenced by several factors. In one aspect, this is not a technique generally applicable. Furthermore, in complex cases, the results depend on the angle of incidence of X-rays. Another drawback of these devices is the fact that the use of X rays is harmful to operators.

Further measurement devices are known that are based on infrared (IR) absorption, where excitation of the coating is made by means of visible light. However, the application of these devices is limited to the cases where the coating is made of material which is excitable by light and on the grade of IR absorption.

Document U.S. Pat. No. 5,712,706 discloses a non-contact laser-based sensor that is guided by a precision mechanical system. The system scans a thread profile and produces a set of computer images of the threading. The computer images are then analyzed to acquire quantitative information about thread characteristics such as pitch, lead, root radius, flank angle, surface roughness, helix variation, and pitch diameter.

However, the device disclosed in U.S. Pat. No. 5,712,706 has the disadvantage that it does not address explicitly the important problem of piece misalignment. Therefore, the system it requires an absolute precision of the operations when aligning the piece to be measured with the mechanical system coordinates. This alignment is conventionally achieved when the piece is at the threading machine.

Unfortunately, performing measurements at the threading machine has several disadvantages. In one aspect, performing measurements at the threading machine adds costly time to the threading manufacturing by preventing inspection and manufacturing processes from running in parallel. In another aspect, performing measurements at the threading machine requires placing delicate optics and precise mechanical components in a hostile environment with cutting oil and strong vibrations present, and to some extent uses the same mechanical movement that has to be verified. Once the pipe has been removed from the lathe, this alignment is very difficult to achieve manually. Consequently, the system disclosed by that document only allows measurement of relative or local magnitudes, such as thread height, by comparing contiguous crests and roots. Errors introduced by a piece misalignment are not "noticed" by that solution and produce an insufficiently precise measurement.

U.S. Pat. No. 5,712,706 also does not address the measurement of important thread parameters. Examples may include, but are not limited to, taper, run-in, run-out, black crest, length of complete thread or specific process parameters such as taper profile, pitch linearity, Fourier mode decomposition of ovality, lathe plate misalignment, hook end angle severity.

The technical article "Lasers gauge pitch" on page 40 of Machine Design, Penton Media, USA, vol. 67, no. 19, 1995 discloses a laser gauge system for gauging threaded sizes.

US Patent Publication No. 2010/0110448 discloses an inspection system for measuring the threaded surface of an internally threaded component. US 2010/0110448 also discloses a method to center the threaded component in the machine. However, this method has limited accuracy and is not compatible with the tolerances to be measured in the field of joints for oil field industry because, due to the weight of the threaded components to be measured, it is not possible to use such system. In particular the process of centering, the drop of a coupling over the collar may cause misalignments that would not be compatible with the tolerances to be measured, which are in the order of microns.

Additionally, both documents disclose devices where sensors are movable along an axis parallel to the axis of the element to be measured. However, they cannot perform measurements along arbitrary trajectories like linear and spiral trajectories.

U.S. Pat. No. 5,521,707 discloses a laser scanner system for rapid precision measurement of thread forms. This system discloses sensors that can perform linear trajectories around the threaded piece to be measured during the rotating movement of said piece. However, such motion is undesirable as such a rotation makes it very difficult to maintain perfect centering between the machine and the threaded piece to be measured.

Another drawback in these documents is that none explicitly addresses the issue of piece misalignment. Therefore, these three systems require a high degree of precision of the when aligning the piece to be measured with the mechanical system coordinates.

Moreover, the measurements obtained with these systems are strongly dependent on the alignment between the element to be measured and the device itself. If the alignment of the element is not substantially perfect, errors may be introduced in the measured values.

In addition, the systems of US Patent Publication No. 2010/0110448A1 and U.S. Pat. No. 5,521,707 can only pair measured values and measuring positions.

Therefore, a need exists for measurement devices and measurement methods for use on threaded joints which provides measurements in a repeatable, satisfactory and sufficiently precise manner.

SUMMARY

Embodiments of the present disclosure provide a measurement method which overcomes the aforementioned drawbacks and limitations.

In an embodiment, a method for accurate, automatically performed, non-contact inspection of threaded objects is provided. The method is applicable to oil pipe threads, especially of pins and boxes.

In accordance with one embodiment, a measurement device for measuring thread parameters of a threaded object is provided. The device may comprise one or more position sensors configured to determine a shape of the threaded object in a first spatial reference system with first co-ordinate axes (X, Y, Z), the threaded object defining a second spatial reference system comprising second co-ordinate axes (X', Y', Z'). The device may further comprise a mechanical moving system where the one or more sensors are mounted on the mechanical moving system and the mechanical moving system is configured to guide the one or more sensors during determination of the shape of the threaded object along a selected trajectory including selected measurement points. The device may additionally comprise a mechanism configured to synchronize output signals of the one or more sensors with spatial positions of the mechanical moving system. The device may also comprise a computing device. The computing device may be configured to control the one or more sensors during determination of the shape of the threaded object. The device may additionally comprise an electronic circuit connecting the computing device to the mechanical moving system and to the at least one sensor.

In accordance with another embodiment, a measurement device for measuring thread parameters of a threaded object is provided. The measurement device may define a first spatial reference system comprising first co-ordinate axes (X, Y, Z). The measurement device comprises at least one computer controlled laser sensor configured to retrieve a shape of a threaded object. The threaded object may define a second spatial reference system comprising second co-ordinate axes (X', Y', Z'). A computer controlled mechanical moving system is configured to receive the at least one sensor for mounting. The mechanical moving system may be further configured to guide the at least one sensor during scanning operations according to predefined scanning patterns or trajectories. Measurement points may be selected along the patterns or trajectories such that a matrix, described in greater detail below, which describes the quadratic form has maximum rank when values corresponding to these measurement points are inserted in the matrix. The measurement device also comprises a mechanism for synchronizing output signals of the at least one sensor with spatial positions of the mechanical moving system. The measurement device also comprises a computing device configured to perform one or more of the following operations: controlling the at least one sensor in the scanning operations; producing computer images of thread shape of the scanned object; store the images; analyse the computer images to obtain quantitative information about thread characteristics, which may include, but are not limited to, taper, seal diameter and ovality, run-in, run-out, thread diameter, pitch along multiple generatrices of the tube, and step height; and calculate said matrix that describes the quadratic form so that the threaded object may be represented in the first spatial reference system and a relationship between the first spatial reference system and second spatial reference system may be provided. The computing device may be in electrical communication with the mechanical moving system and the at least one laser sensor. For example, an electronic circuit may connect the computer to the mechanical moving system and to the at least one laser sensor.

BRIEF DESCRIPTION OF THE DRAWINGS

The foregoing aspects and many of the attendant advantages will become more readily appreciated as the same become better understood by reference to the following detailed description, when taken in conjunction with the accompanying drawings.

DETAILED DESCRIPTION

The terms "approximately," "about," and "substantially" as used herein represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of the stated amount.

In the disclosed embodiments, reference is made to a pin of an oil or gas pipe. However it may be understood that embodiments of the disclosure may be applied to any other similar threaded objects, such as screws or similar objects. All these kinds of objects, at a certain stage of the measurement method, may be coated, using any type of coating technology. In certain embodiments, the coating may be a dry coating but, in alternative embodiments, other types of materials may be used as coatings, depending on the function to be achieved by the coating. The coating is not shown nor indicated in the figures because of their schematic character and of the small thickness of the coating layers. However, it may be further understood that the figures apply also to the cases where a coating is present on the measured object.

In the following description a trajectory may be referred to as the path followed by a laser sensor through space, describing a sequence of values of the surface location with respect to the laser sensor.

Figure 1:
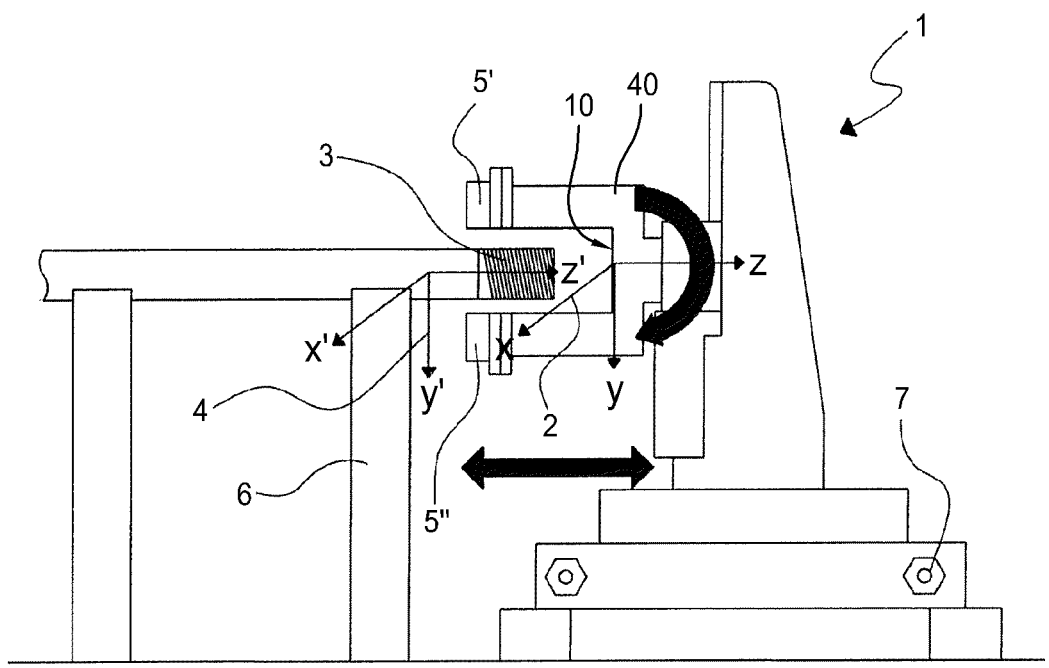
FIG. 1 is a schematic axonometric view of a an embodiment of a measurement device according to the present disclosure.
Figure 1A:
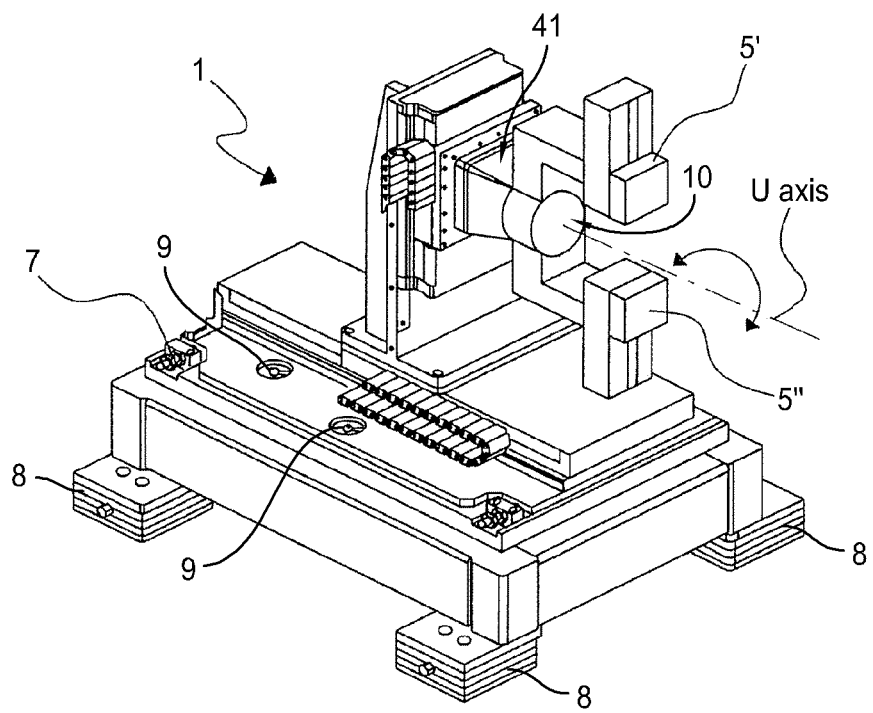
FIG. 1*a* is a perspective view of the measurement device of FIG. 1.

With reference to FIGS. 1 and 1a, schematic illustration of a first part of an embodiment of the measurement device is shown, together with a second part of the measurement device that incorporates the electronic and computer hardware that are further included within the measurement device. The first part of the measurement device 1 may include laser displacement sensors and the pipe support, is defined conventionally as the measurement hardware 1 of the measurement device 1 of the present disclosure, to distiguish it conventionally from the electronic hardware.

This measurement hardware may possess its own Cartesian reference system 2, defined by the orthogonal axes (X, Y, Z). A threaded portion of a pin 3 to be measured is shown on the left of the figure. This pin 3 has its own Cartesian reference system 4 defined by the orthogonal axes (X', Y', Z'). In FIG. 1, the pin may be positioned far from the measurement device 1, in a rest position on a bench 6.

In embodiments of the present disclosure, for the sake of simplicity, reference may be made to a pin 3 of an oil or gas pipe as object to be measured. However, it may be appreciated that the present disclosure can be employed for any other similar threaded objects, including, but not limited to, screws or similar objects. Embodiments of the measurement device 1 may also be applied in those cases where a coating is present on the measured object.

After initial installation of the measurement hardware, the pin 3 may be mounted on the measurement device 1 to perform the measurement operations. The respective pin 3 and measurement device reference systems may also be placed as close as technically possible one to each other, using the horizontal and vertical angular and lateral displacement movements provided by the device (see, e.g., FIG. 1). Nevertheless, despite all possible care, the two Cartesian reference systems may not coincide exactly. As a result, small misalignments, both in the angular and in the lateral position of the reference system 2 of the pipe, with respect to the measurement device may still exist. Even more, when another pin 3 is successively positioned on the measurement hardware 1, its angular and lateral positions may differ from the previous pin due to placement errors and geometrical differences (e.g. hook end) between the pieces.

Due to these reasons, under operative conditions the misalignment of pins, or more generally of the threaded parts of pipes with respect to the measurement device, misalignment can be on the order of millimeters in linear displacement and on the order of one degree in the angular displacement. By adjusting the position of every pin, a smaller misalignment value could be achieved. However, that scenario is impractical in reality. Embodiments of the measurement device 1 of the present disclosure may achieve the measurements without any lateral or vertical adjustment of the knobs 7, shown in FIGS. 1 and 1a, after initial installation.

Embodiments of the measurement hardware of the measurement device 1 may comprise two laser displacement sensors, 5' and 5". The sensors 5' and 5" may be mounted on a yoke piece 40. The yoke piece 40 may be, in certain embodiments, machined from a single aluminium piece to minimize mechanical movements. This yoke piece 40 may be further mounted on a rotational stage configured to pivot about a U-axis. The yoke piece 40 may belong to a head 41 of the measurement device 1, together with the laser sensors 5' and 5". Each sensor 5', 5" may be mounted on an X-stage that can move in the radial direction (i.e. the X-axis), using linear rotary motors, not shown. Angular and linear movements of the stages parallel to the Y axis and orthogonal to the X axis may allow each stage to be aligned along the same line. Embodiments of both laser sensors 5' and 5" can also be adjusted by lateral and angular displacements to align the center of the laser beams with respect to the center of rotation of the head 41.

In further embodiments, the X stage can be motorized so that it can be used for an automatic change of pipe 3 diameter, while maintaining the sensors 5' and 5" within their range.

The head 41, in this embodiment, may be suitable for measuring operations on a pin 3 having a male external threading.

Finally, in additional embodiments, there may also be provided a third linear stage, (moving along the Z-axis). This third linear stage may allow displacement of the head parallel to the device Z axis. The third linear stage, movable along the Z-axis, may be mounted on a base that may be hard coated on the bottom, allowing smooth displacement with respect to the base when the measurement device 1 is set up for the first time, as shown in FIG. 1a. Four knobs 7, e.g. placed one on each corner, may allow for horizontal angular and lateral displacement in a plane. There are also provided screws 9, or equivalent mechanisms, to fix the hardware of the measurement device 1 so as to inhibit movement of the head 41 once the initial alignment has been accomplished. There may also be provided a wedged pad 8 on each of the four legs to regulate height and out-of-plane angular alignment.

Beneficially, these features of embodiments of the measurement device 1 may provide easy initial installation of the measurement device 1 in a pipe manufacturing plant, allowing for small corrections to levelling tolerances, to conveyer alignment, and to imperfections in the levelling of the plant floor.

Figure 19:
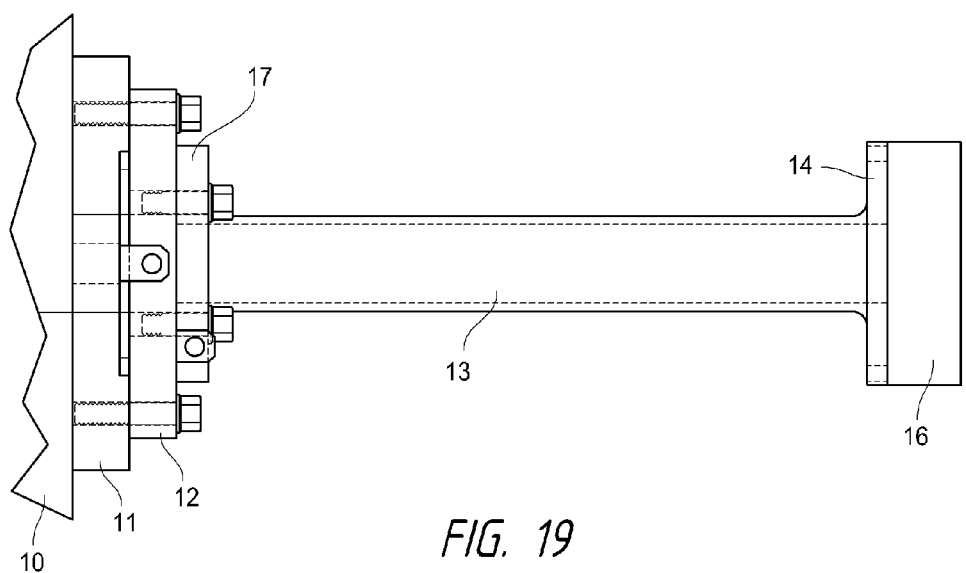
FIG. 19 is a schematic illustration showing an enlarged lateral view detailing an embodiment of the measurement device of the present disclosure.
Figure 20:
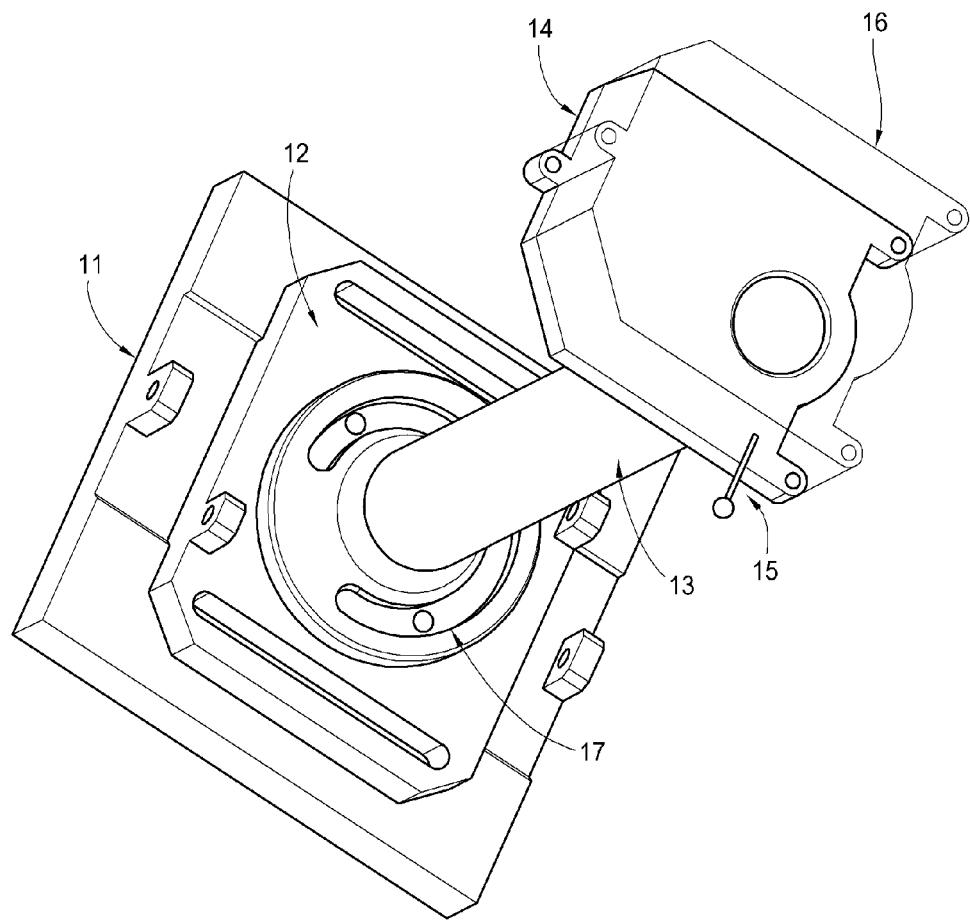
FIG. 20 is a schematic, axonometric view of the detail of FIG. 19.

With reference to FIGS. 19 and 20, another advantageous embodiment of the head 41 may provide for a solution that allows measuring operations to be performed on the internal female threading of the box.

On the central part of the yoke 40 there may be mounted a laser sensor support. The sensor support may comprise a fixation plate 11 and an intermediate plate 12 that forms a base for a support 13 (e.g. made of a tubular element). In certain embodiments, a circular flange 17 may be provided to fix the support 13 to the intermediate plate 12. This circular flange 17 may possess two peripheral slide type fixation devices, allowing angular regulation during the installation of the measurement device 1 in a mill.

At a distal end of the support bar 13, in respect of the fixation plate 11, a support plate 14 may be substantially rigidly mounted on the support bar 13. The support plate 14 may be machined from a single aluminium piece, in certain embodiments, in order to reduce mechanical backlash.

A laser sensor 16 may also be provided. The laser sensor 16 may comprise a laser source 15 and may be further fixed to the support plate 14. For example, three locking screws may be employed to affix the laser sensor 16 to the support plate 14. The support plate 14 may be configured so that, once the laser sensor 16 is fixedly attached to it, the direction of the laser beam emitted by the laser source 15 may pass through the axis of rotation of the support bar 13. In this manner, the laser beam may be kept perpendicular to the internal pipe surface.

This structure comprising the plates 11, 12, the support 13, and the plate 14, together with the laser sensor 16, may be mounted on the rotational stage 10, able to pivot about the U-axis, of the head 41 of the measurement device 1.

An outer envelope of the laser sensor 16 and laser beam 15, entrained by the rotation of the yoke 40, may also be configured in such a manner that it fits inside the box without interfering or touching the internal surface.

In an embodiment, either the complete combination of the intermediate plate 12, support bar 13, and support plate 14 can be dismounted for necessities of tube diameter change, or, alternatively only the support plate 14 with the laser sensor 16 can be dismounted.

The embodiment heretofore described can be used for the measurement of boxes with female threading. In this case, the head 40 of the measurement device 1 can be equipped with the sensor 16 and the associated support structure, as shown in FIGS. 19 and 20, without the sensors 5', 5" for external threading.

In another embodiment (not shown separately in the figures), both the laser sensors 5', 5" may be mounted simultaneously on the rotational stage of the head 40 for external threading, as shown in FIGS. 1 and 1a. In further embodiments, the laser sensor 16 may be mounted with the associated support structure, as shown in FIGS. 19 and 20. When using an embodiment of the measurement device 1 in this configuration, one of the sensors may be automatically disposed in the measuring position (e.g. the sensor for measuring internal threading). In that manner, having two types of heads on one machine that is in line with the threading machine, both pins and box ends can be measured alternatively in subsequent operations by replacing a box with a pin.

Besides the described measurement hardware 1, embodiments of the measurement device 1 of the present disclosure may also comprise an electronic part. The electronic part may comprise a computing device 30 to control the measurement operations that are carried out. In certain embodiments, the computing device may comprise a personal computer (PC), although other computing devices known in the art may be employed without limit, The computing device 30 may be configured to perform a variety of functions. Examples may include, but are not limited to, producing computer images of the thread shape of the scanned threaded object, storing the images, and analyzing the computer images to obtain quantitative information about thread characteristics below indicated. Storage of computer images may be accomplished using a storage device. Embodiments of the storage device may include network-based storage devices communicating with any component of the measurement device 1 via a network. In alternative embodiments, the storage device may include storage that is in local communication with any component of the measurement device 1.

Figure 18:
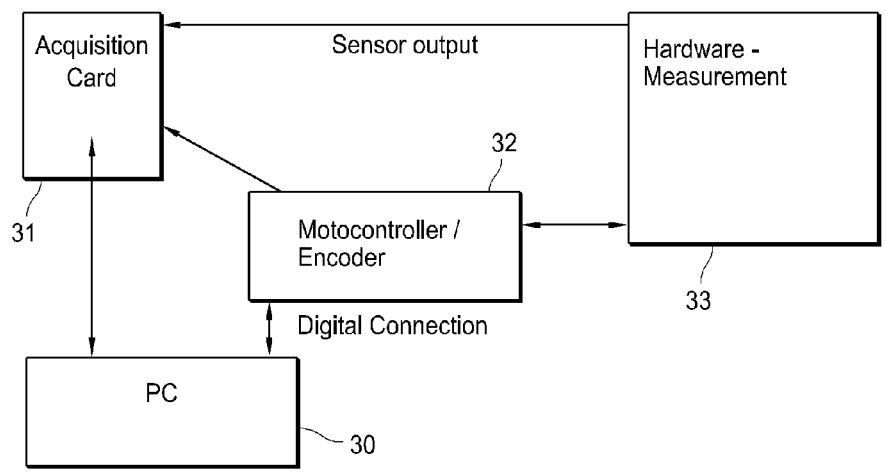
FIG. 18 is a schematic illustration of an embodiment of the measurement device.

The measurement device 1 may be in electrical communication with its respective components. For example, schematic illustration of a circuit interconnecting all the components of the measurement device 1 is shown in FIG. 18. The computing device 30 may be connected by a digital connection to an encoder/motocontroller 32 and also to an acquisition card 31. The encoder 32 in turn may be connected on one side to the acquisition card 31 and on another side to measurement hardware 33. This configuration creates an intermediate connection between the computing device 30 and measurement hardware 33.

The measurement hardware 33, which schematically represents substantially the hardware of the measurement device 1 the embodiment of FIGS. 1 and 1a, may be connected to the acquisition card 31 by data connectors to transmit sensor outputs and signals to the computing device 30 over the acquisition card 31 that communicates with the computing device 30 through a PCI bus. These outputs may be collected at a designated rate and sent to the acquisition card 31 through a digital connection. The acquisition card 31 may also acquire signals coming from the motocontroller/encoder 32 and enabling signals. The computing device 30 communicates with the motocontroller/encoder 32 through a digital link for setting parameters and loading/running of CNC (Computer Numerical Control) programs. Encoder signals and servo-control signals of the three stages of the head 40 are wired to the controller using cables and connectors.

Besides the measurement hardware 33, the other components of the layout of FIG. 18 can be integrated in an electronic board associated to the computing device 30, which can be placed close or far from the measurement hardware 33, depending on necessities of operators.

A spatial synchronization between non-contact sensors and their special position may be performed, where the encoder 32 detects an angular position of the sensors and, through that spatial position, may determine a spatial position of the sensors at each instant, during the measurement procedure.

In another embodiment of the measurement device 1, a temperature compensation system may be provided. In this manner, the effects of temperature can be alleviated and measurements can be referenced to a "reference temperature," rather than to the temperature in which the measurement was made. Temperature measurements may be performed on the pipe, the cabin, and the measurement device 1, allowing correction of undesirable temperature effects by using a look up table of pre-calibrated correction values.

The manner in which embodiments of the measurement device 1 may be used to perform measurements on threaded objects are described in detail below. After the initial installation may be carried out, as described above, a typical measurement operation may include: data acquisition and data analysis. Although measurement procedures are described herein for external male threads on pins, the same procedures may be applicable to female threads on boxes by making the appropriate adaptations. For example, the functions of the sensors 5', 5" may be replaced with those of sensor 16.

Embodiments of the data acquisition procedure are now described. During this procedure the laser sensor output signals and positions of servos are stored in a synchronized manner ensured by the use of hardware signals to enable windows and counters. Below, a description is given of the signals used.

Figure 2:
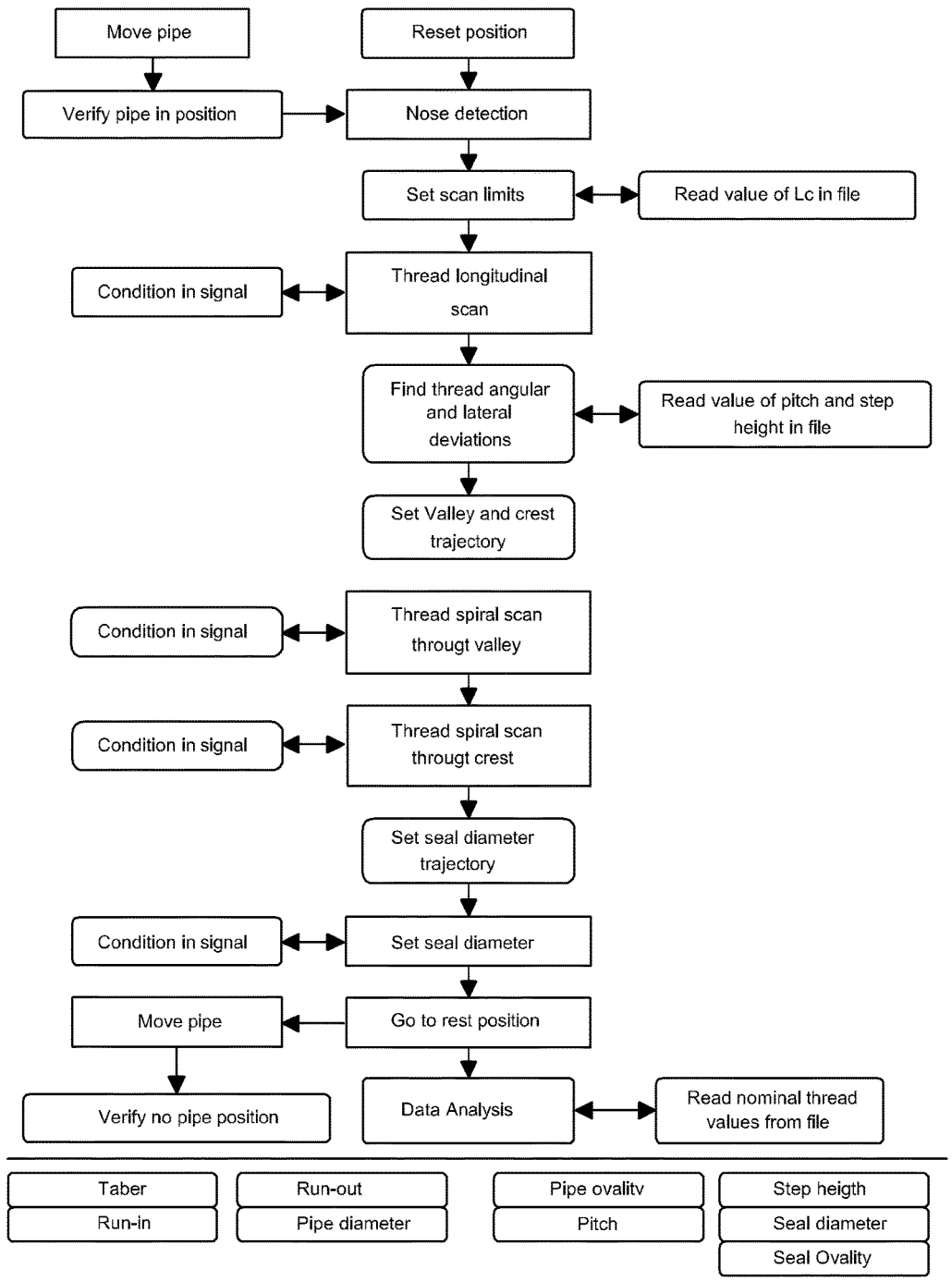
FIG. 2 is schematic flow diagram illustrating an embodiment of a measurement method performed by the measurement device of FIG. 1.

FIG. 2 presents a schematic flowchart that illustrates the general working scheme of the data acquisition procedure governing the measurement process once the initial calibration and plant installation has been performed. The data acquisition procedure starts by verifying that the pipe is in position aligned to the measurement device. Subsequently, the measurement device 1 may execute a first longitudinal scanning operation along the threaded portion of the pipe to find the relative position of the pipe nose with respect to the frame of reference of the measurement device. After the relative position of the nose is detected, all distances reported during measurement may be referred to that point. If the measurement operation of the threaded pipe provides for only one scanning operation, the data may be gathered in correspondence with points belonging to the path followed by the sensors 5' and 5". This may be generally done as the data collected are considered sufficient to the needs of the users.

If the measurement procedure on the threaded object provides for several scanning operations along several trajectories on the coated or uncoated surface of the threaded portion, data may be also collected on predefined points along these trajectories. The choice of the measurement points where data are gathered may be made in such a manner that a matrix describing the quadratic form has maximum rank when values corresponding to these points are inserted in it.

In an embodiment of the method according to the present disclosure, a plurality of longitudinal profiles (e.g. six) may be scanned at equally spaced angular steps. Data gathered by these scans may be processed to remove spurious peaks and pass encoder counts to physical units. The gathered data may be further used to calculate a first estimation of a thread angular misalignment with respect to the measurement device frame of reference and reassign the nose position. This reassignment may be performed by averaging the six nose positions corresponding to the six scans.

These scanning operations may also be used to detect the positions of the crests and roots of the threads and determine a spiral trajectory table. The spiral trajectory table may be determined interpolating this information allowing successive scanning operations over the center of the crests or roots of the thread. Data acquired by spiral scanning operations may also be conditioned and used to measure the misalignment in respect of the thread frame of reference more precisely. After this operation, and having detected the orientation of the thread, a table for the seal or seals, run in and run out trajectories can be constructed in the reference frame of the threaded object (X',Y',Z'), transformed to the measurement device coordinate system, and executed.

After the end of the scanning operations, the head of the measurement device may return to its rest position and data analysis may be started in order to obtain all the parameters of the thread under test.

The specific measuring operation when the object to be measured may be coated pin may follow embodiments of the procedure now described. The pin 3 may be dismounted from the measurement device 1 and, at a subsequent moment in time, a coating operation of the threaded object may be performed in an appropriate place. One or more layers of coating material may be laid on at least part of the pin threading and/or surface. The coating can be laid also on specific surfaces of the threading, like thread crests, flanks or roots by means of any known technology.

When the coating operation is performed, the pin 3 may be again mounted on the measurement device 1, or similar device, and the measurement steps described above may be replicated on the same predefined trajectories on the surface of the threaded portion. Data may again be collected on the same predefined points along these trajectories, which were selected before the coating operation, and the same calculations, as already described, may again be performed. Consequently, a comparison of the data acquired before coating the threaded object and after coating the threaded object may be carried out. In this manner, the thickness of the coating at all measurement points of the pin may be calculated.

The measurement procedure described before in broad terms is hereafter described in detail along with various embodiments of the measurement method of the present disclosure for calculating a series of specific parameters of the threading. This procedure may be applied to both stages, before the pin is coated and after the pin has a coating laid on its surface. It may be appreciated that embodiments of the measurement method of the present disclosure can be applied to the cases where coating is made in successive distinct layers. In this manner, quality of the intermediate layers and of the final layer resulting from the superposition of various layers may be measured.

The data acquisition may begin with nose detection. Nose detection may include conducting a linear scan along the Z-axis between two reference distances where the nose is estimated to be located. It will be appreciated that this linear scan can be the only scanning operation predefined in the measurement method or it can also be the first scanning operation of a plurality of successive scanning operations.

The signals provided by the laser sensors 5 may be further analysed by making a check of the presence or absence of Out Of Range (OOR) values. An OOR value consists of a non-valid point (i.e. out of the physical range of the sensor), as sent by a sensor when no object may be found in the measurement range of the sensors. These signals are processed by defining a sampling window having a selected number of data points (e.g. fifty data points) and verifying that all samples are not OOR. The number of data points depends on several factors, including but not limited to, the shape of the pin surface, the type of threading, the type of joint, etc. In certain embodiments, the number of data points can be either above or below fifty. The sampling window may be then moved one step further and the values of the signals sent may be checked again until all samples in that window are recognized as valid data points after processing. The first sample of that block may be defined as the nose position of the pin.

Figure 3:
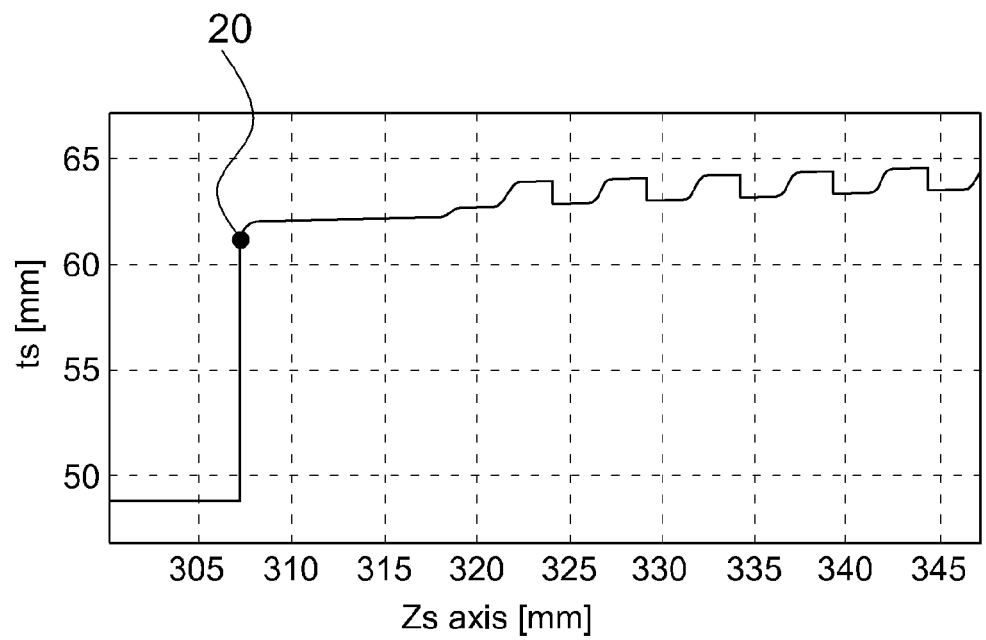
FIG. 3 is a graph showing results of an operation in an embodiment of a data acquisition procedure.

The graph of FIG. 3 illustrates the results produced by a scan during nose detection. FIG. 3 shows OOR values previous to the encounter of the laser sensors with the pipe nose, where the dot 20 indicates the position, with respect to the Z axis, where the nose has been detected. After this point has been detected, scanning may be stopped, and the following operation of the data acquisition procedure may be started.

An accurate determination of the nose position optional for measuring most of the thread parameters of interest that are based on relative distance measurements. Exceptions may include measurement of pipe and seal diameters. These parameters are measured at a precise distance relative to the nose position because the thread taper changes its values if measured elsewhere.

Figure 3A:
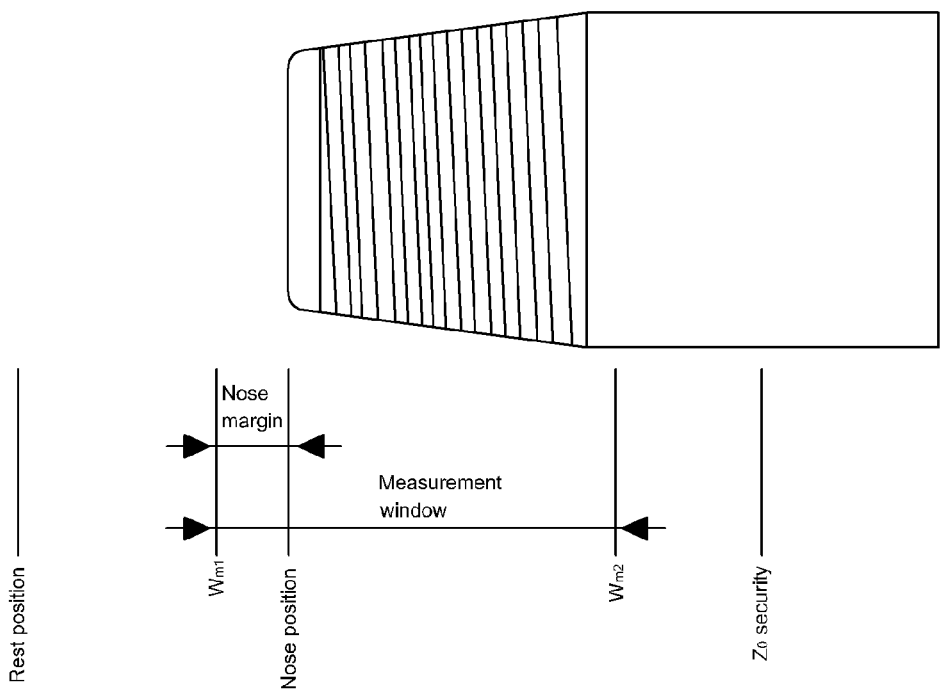
FIG. 3a is a schematic illustration detailing a threaded object which can be measured by embodiments of the disclosed measurement device.
Figure 4:
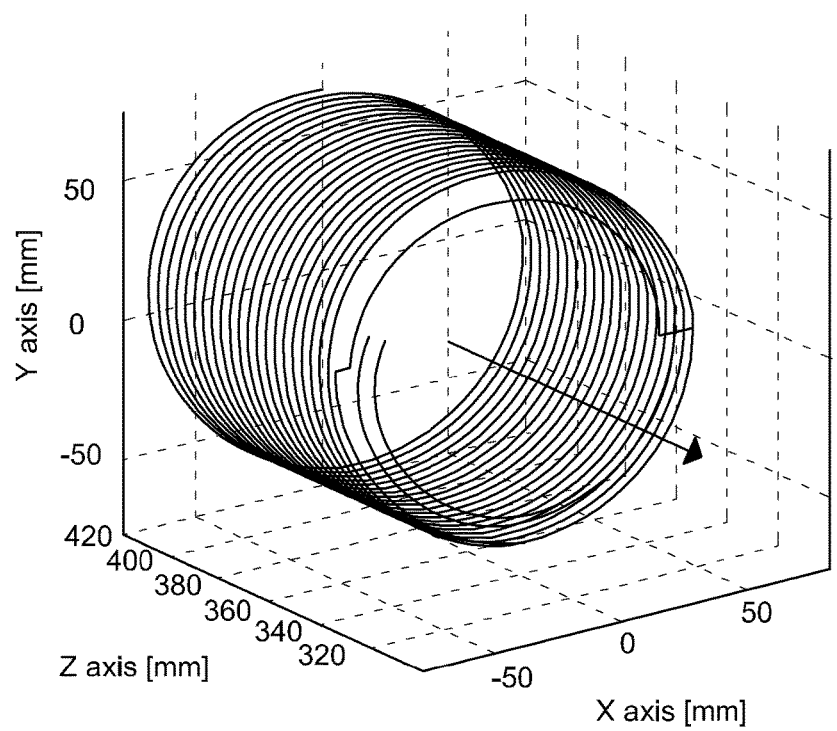
FIG. 4 is a graph illustrating another operation in an embodiment of the data detection procedure.

After the position of the nose has been determined, in those cases where nose detection may be necessary, several longitudinal scanning operations (e.g., three) are performed along the Z-axis direction by acquiring outputs at the same time from both laser sensors 5', 5". It may be understood that a greater or smaller number are of scans may be performed. The limits of the scanning range window may be represented generically in FIG. 3a.

From its resting position, the head of the measurement device 1 may be driven back to the first position of the measurement window, indicated by $W_{m1}$, corresponding to the nose position, which may be at the end of the nose margin.

When the sensors are placed in position $W_{m1}$, a movement towards security point $Z_0$ may be indicated and the window signal that resets encoder counts may be enabled. The number of encoder counts to be acquired by the laser sensors may be preset to fit into the measurement window longitude. When this preset number may be reached, the head of the measurement device may be commanded to stop at the point indicated by $W_{m2}$. In this manner, the measurements from the laser sensors 5', 5", together with encoder counts, may be acquired in the measurement window segment. Longitudinal scans may be subsequently implemented in the inverse direction. Similar limits for encoder counts to be acquired by the laser sensors may also be set for these movements in the opposite direction. This movement in the reverse direction towards the rest position starts from point $W_{m2}$ and ends in point $W_{m1}$, where it stops after having reached the predetermined encoder counts to fit the measurement window.

Figure 6:
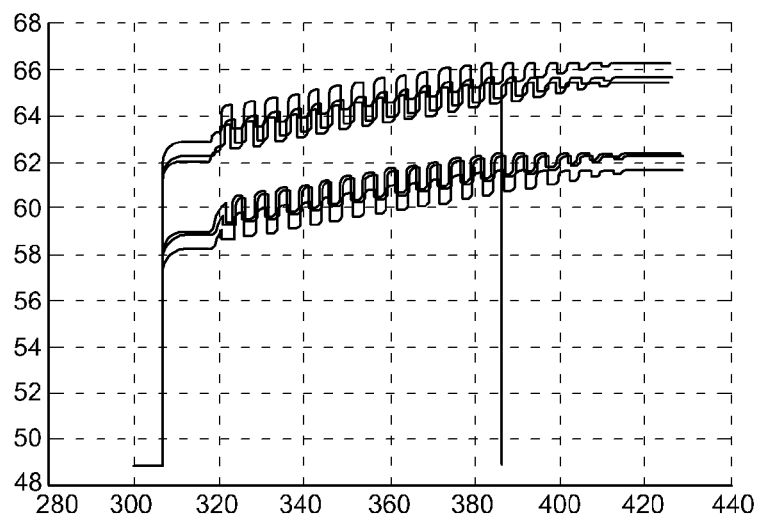
FIG. 6 is a graph illustrating results of further operations in an embodiment of the data acquisition procedure.

FIG. 6 illustrates a longitudinal scan, where signals generated by both laser sensors 5', 5", placed at an angular distance of 180° apart, are acquired. In this example three scans result in six profiles, where there are two groups of three profiles, each corresponding to one of the laser sensors 5' and 5", of the thread under test. These scans are useful for giving a first estimation of the thread misalignment. If necessary, the measurement device 1 can be operated with only one of the two laser sensors 5', 5" detecting signals emitted by one laser beam.

The quantity of scans, given here by way of example, can also be more or less than three, depending on the object to be measured and depending on the parameters that are sought. In these cases, pitch and step height along six generatrices are the parameters sought.

Another embodiment of the measurement method provides a data acquisition operation. The data acquisition operation includes detecting selected points on thread crests and roots made by performing a number of longitudinal scans parallel to the Z axis. Data collected from these scans may also enable points to be determined on thread roots and crests that are used for the definition of trajectories along which two subsequent spiral scanning operations are performed, one along the thread crest and the other one along the thread root. By being generated previously in this manner, the trajectory may avoid falling off the crest or climbing out of the root during the scanning operation when the object may be misaligned with respect to the X', Y', Z' co-ordinate system.

The measurement operation may begin by detecting thread load flanks. This detection operation may include detecting load flanks for each longitudinal profile. Detecting load flanks may be performed by differentiating the whole data vector and evaluating values that override a preset threshold. A vector containing all zero values may be generated, excluding those detected points which are candidates for indicating the presence of a load flank.

Another vector may be generated which represents a theoretical comb with teeth of a specific detection width and nominal pitch separation between the teeth. These two vectors may be cross-correlated in order to find the relative position between the comb and the load flank 21 candidate vector that maximizes the cross correlation (see, e.g., FIG. 5). The cross correlation may include performing a scalar multiplication of the two vectors and finding the sum of the resulting vector while changing their relative vector index.

Subsequently, load flanks 21 may be assigned in correspondence with the points found as candidates for each comb tooth according to the following criteria:

If one candidate flank is present (which may be defined as type 0): this flank is a real load flank.

If no candidate flank is present (type 1): a flank may be created just in the middle of the thread comb interval for the purpose of producing the spiral trajectory.

If more than one candidate flank is present (type 2): there may be spurious flanks in the thread comb. As a result, the nearest to the middle point of the thread comb interval may be determined as the real load flank. The remaining ones are dismissed.

If an out of range is found in the interval (type 3): the flank may be discarded and a virtual flank may be created for the purpose of producing the spiral trajectory.

Figure 7:
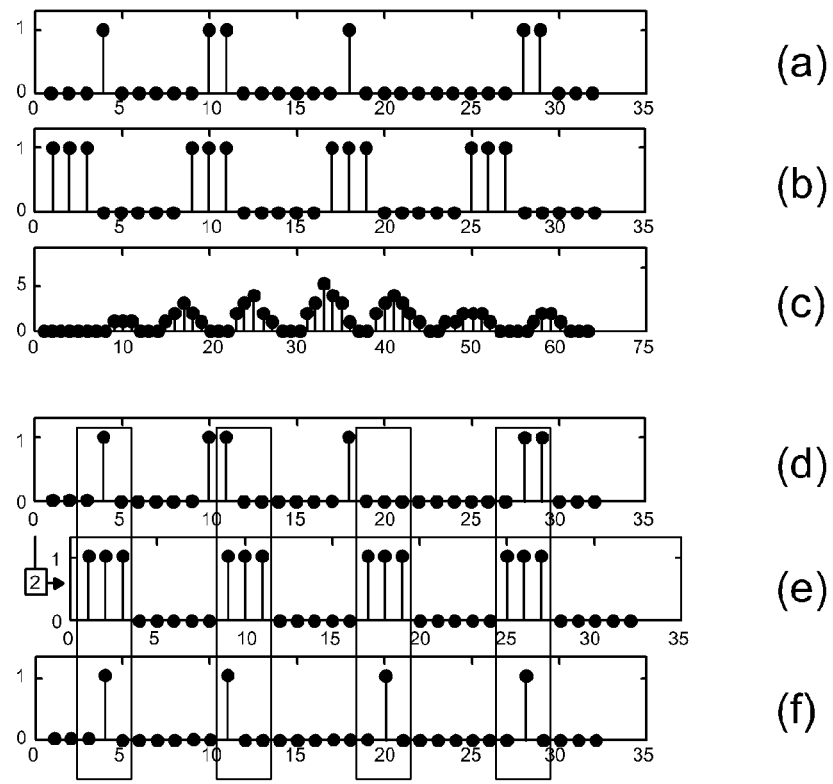
FIG. 7 are graphs illustrating hypothetical assignations of load flanks.

FIG. 7 shows hypothetical load flank candidates and comb vectors in the three mentioned cases possible for assigning loading flanks.

Figure 5:
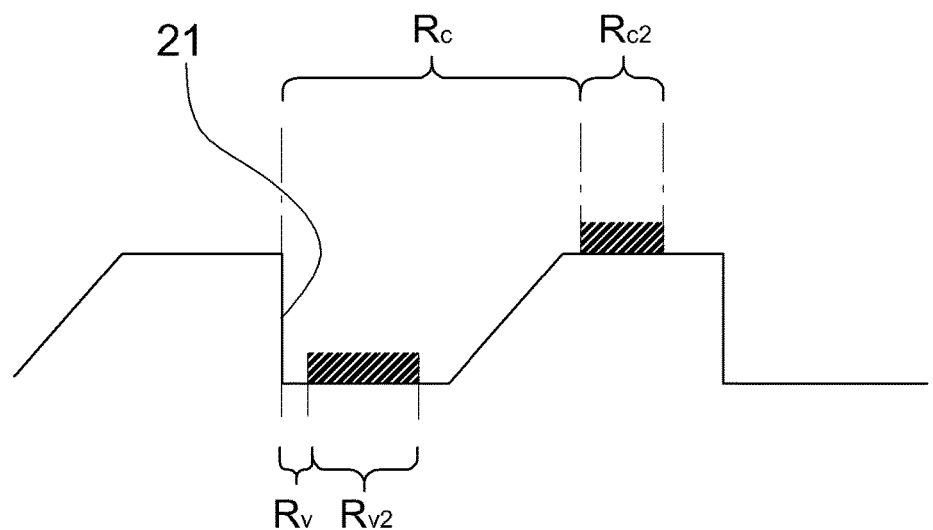
FIG. 5 is a schematic illustration of a thread longitudinal section where measurements according to embodiments of the present disclosure.

Another embodiment of the measurement method provides for assigning points along crests and roots, where the crests and roots segments are determined following the thread mechanical drawings with the parameters $R_c$, $R_{c2}$, $R_v$ and $R_{v2}$ as shown in FIG. 5.

Each segment may be conditioned by filtering OOR and possible peaks taking into consideration that the segment should be a line. Then, the point corresponding to either root or crest may be calculated as the mid segment point.

FIG. 7 illustrates a longitudinal scan, where those points detected as being root and crest points are indicated. Graph (a) illustrates the candidates for load flanks, graph (b) illustrates the theoretical comb, graph (c) illustrates the cross-correlation, graph (d) illustrates candidates for load flanks, graph (e) illustrates the displaced theoretical comb, and graph (f) illustrates assigned load flanks. As can be seen in FIG. 7, points may be generated by extrapolating the determined points in the threaded portion for location prior to the nose position, and after the end of the thread where the non-machined part of the pipe starts. This may be done to smoothly enter and emerge from the threaded portion during execution of the spiral scan, to obtain the phase of the thread relative to the measuring device frame of reference, to estimate the position of the black crest, to calculate the lathe eccentricity axis, and to measure the pipe hook end.

The root points determined in each longitudinal scanning operation may also used for fitting a quadric surface representing the cone of the thread being analysed so as to gather a first estimation of the thread angular misalignment with respect to the measurement device reference frame. Crest points are preferably not used in this calculation for two main reasons:

a) The determination of these points may be more inaccurate than that of root points, (i.e. the portion of the pin where determination of the roots may be performed is longer).

b) The number of root points over the thread surface cone may be higher than that of the crest points due to the presence of "black threads" generated in the manufacturing process.

A generic matricial form of the quadric surface may be described in Equation[1].

$$\bar{x}^t \cdot A \cdot \bar{x} + \bar{b} \cdot \bar{x} = 1 \qquad [1]$$

where $\bar{x} = [x, y, z]^t$
is a point of the quadric in the 3D space, A is a symmetric matrix related to the quadric (it may be formed by nine parameters, three for translation, three for orientation and three for the quadric form as expressed in a canonic frame) and $\bar{b}$ is the quadric displacement vector. The selected data may be fitted to the expression shown in Equation[1] by using a least squares approximation, from which the parameters of the quadric (e.g. the parameters that conform to A and $\bar{b}$) are obtained.

These data may be employed for the conformation of a linear transformation and its inverse transformation between the measurement device and thread reference frames.

The subsequent operation may include spiral scannings, both along root and crest of threads. The information acquired before relating to the root and crest mid point positions, for each longitudinal scan, may be interpolated and used to build two spiral scanning tables. The root mid points may be transformed to the thread coordinate frame. Afterwards, a linear fit may be performed over the data resulting from a t vs. Z arrangement. Subsequently, a new set of points may be generated segmenting the fitted line with a regular step. These points may be transformed back to the measurement device reference frame and passed to a controller for the calculation of the servo references. The same procedure may be applied on the crest mid points for generating the crest scanning table.

Preferably, the root scan may be executed starting from the nose while the crest scanning may be executed in the opposite direction, considering the Z-axis. FIG. 5 illustrates a root and crest scanning expressed in respect of the measurement device reference frame. Data obtained from the root spiral scan may be used to calculate a better estimation of the measurement device to thread misalignment that may also used to recalculate the transformations between reference frames that are applied in the data analysis.

Figure 8:
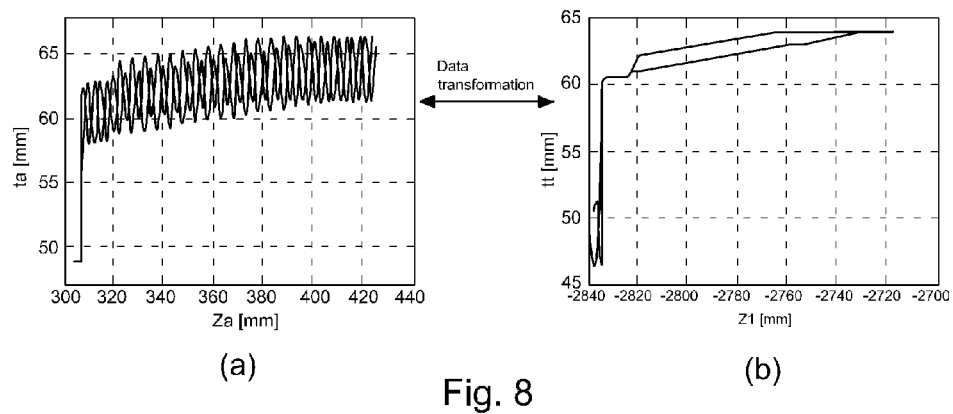
FIG. 8 are graphs illustrating results of spiral scans.

FIG. 8 illustrates t vs. Z graphs for the measurement device reference frame, graph (a), as data are acquired and for the thread reference frame, graph (b) transformed using the misalignment estimation calculated from the spiral scans. The graph (a) of FIG. 8 shows on the left what the effects of misalignment are on the acquisition procedure.

Figure 9:
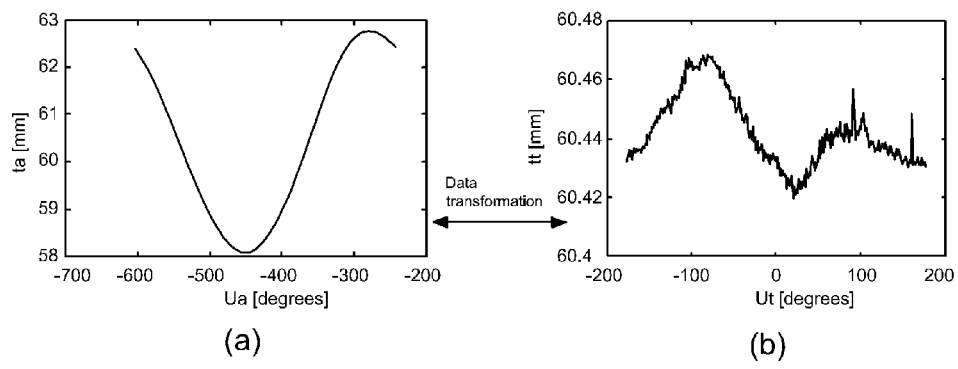
FIG. 9 are graphs illustrating results of seal scans.

In an embodiment of the measurement method, a data acquisition procedure provides for scanning the seal of the thread. In this case, an ideal circular trajectory may be generated with reference to the thread reference frame at a predetermined distance from the nose and then transformed to the measurement device reference frame for its execution. FIG. 9 illustrates two graphs containing the results of a seal scan, where graph (a) shows the scan expressed in the measurement device reference frame and graph (b) shows the scan in the thread reference frame.

This scanning trajectory is preferably executed starting at a predefined distance from the pin nose and in alignment with the threaded object because the nose profile may be complex and the radius measured may be highly dependent on the exact position measured. A good estimation of the nose position may be calculated when a plurality of scans may be made, e.g. six. In this example, the nose position detected on each of the six longitudinal scans may be retrieved. These data are then transformed to the thread reference frame and averaged to get a single, more accurate, nose reference.

In another embodiment of the measuring method, the phase of the thread with respect to the device reference frame may be retrieved from the spiral root scan and a longitudinal trajectory may be set in the thread reference frame such that it passes through the measuring points determined in the inspection report for the measurement of the run-in. Similarly, a trajectory may be set for the points defined for the measurement of the run-out.

After data acquisition operations are completed, data analysis may be performed on the acquired data, but transformed to the thread reference frame, as a final part of the measurement method according to the present disclosure. Unless indicated differently, in the following all data are expressed on the threaded object reference frame.

Figure 10:
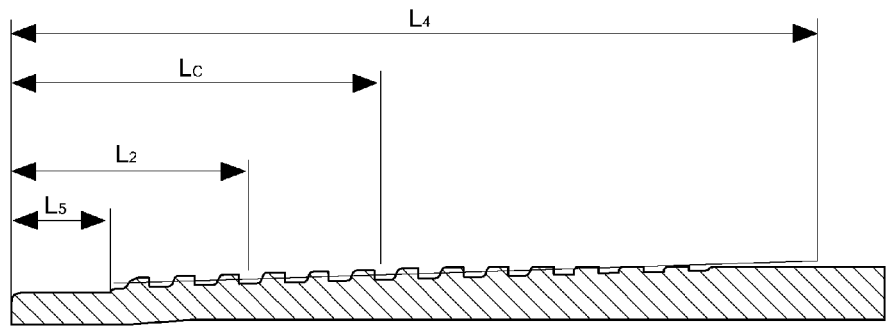
FIG. 10 is a schematic illustration of a thread on which an embodiment of the disclosed measurement device may be employed.

The parameters may be indicated in relation to different length references taken on the thread and referenced to the nose position. FIG. 10 shows the three references used in data analysis that will be referred to below.

$L_5$ is the length to the beginning of the thread;

$L_2$ is the reference length for the thread diameter and ovality calculation;

$L_c$ is the minimum length where the thread parameters must fulfil the tolerances;

$L_4$ is the length to the end of roots and crests, which may be lower than the pull-out length where the run-out is measured.

The taper may be determined in one operation of data analysis. The equation that describes the outer surface of the cone thread may be given by Equation[2]:

$$t_{thread} = (R_0 - A \cdot Z_{thread}) \quad [2]$$

where $t_{thread}$ and $Z_{thread}$ are the radial and azimuth coordinates in the thread frame of reference,
$R_0$ is the primitive radius, and A is the taper of the pin threading.

Figure 11:
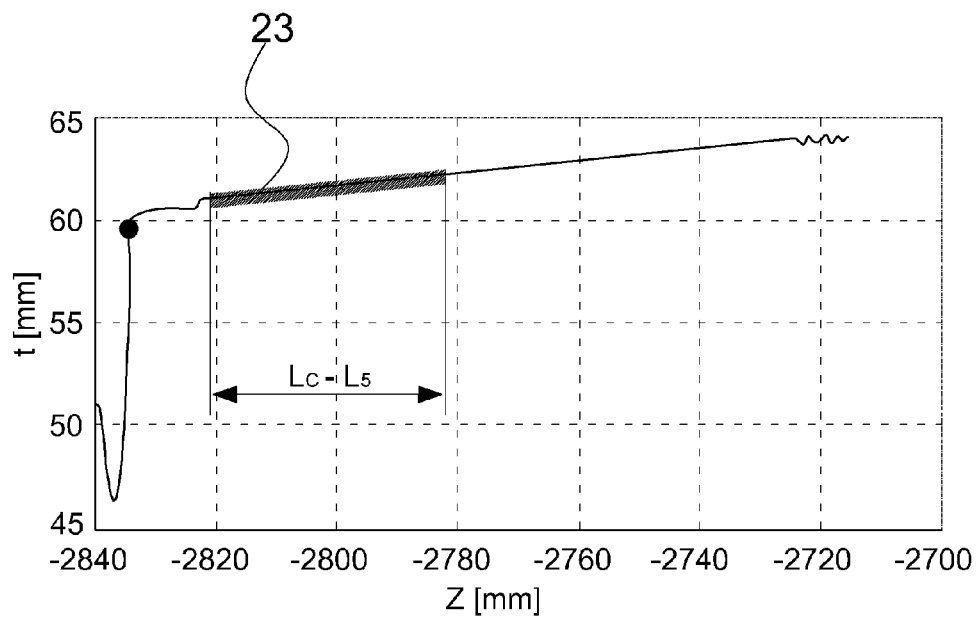
FIG. 11 is a graph showing results of thread root scans.

To calculate the taper, the t vs. Z relationship from the root scan of the thread may be used. Data acquired previously between $L_5$ and $L_c$, corresponding to segment 23 of the curve, may be analyzed as shown in FIG. 11. A linear fit may be performed over these data 23 to calculate the slope, comprising the values of taper and of A. The deviations of the data with respect to that linear fit may be calculated. Those deviations contain information regarding the machining process (e.g. the non-compensated forces due to the change in pipe stiffness along the thread object and the over tightening of the pipe on the lathe). This information can be retrieved using a Fourier modal analysis as a function of the thread position. For example a large three-mode means over tightening of the pipe on the lathe may have occurred, while a parabolic behaviour of the fundamental mode means that the tool may have been taken before the end of the $L_c$.

Figure 12:
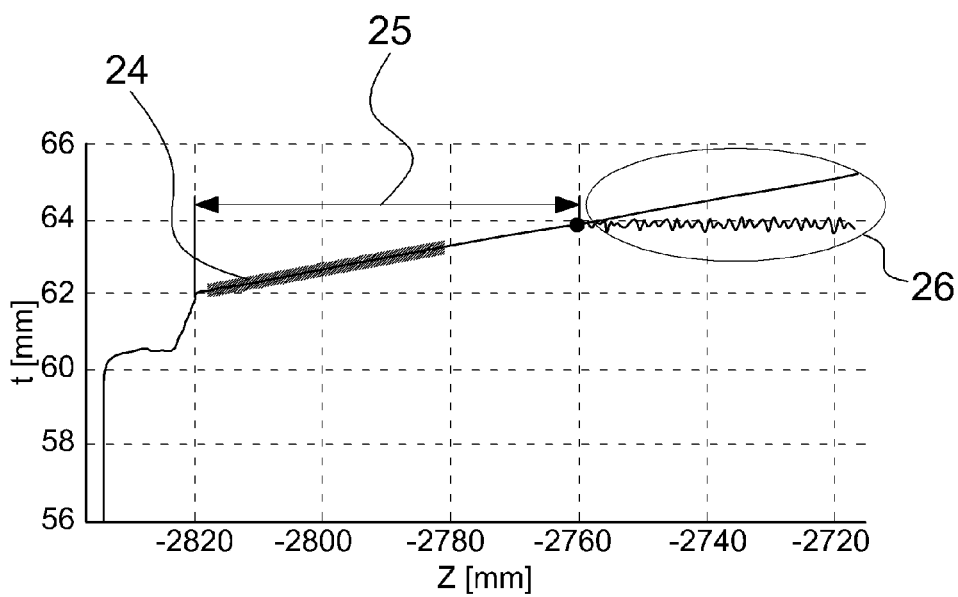
FIG. 12 is a graph showing results of thread crest scans.

Full thread length, corresponding to the segment 25 of the curve of FIG. 12, may be analysed considering the data gathered from the crest scanning. First a linear fit may be performed using the acquired, and filtered, data between $L_5$ and $L_c$, corresponding to segment 24. Deviations of the data with respect to the linear fit are calculated. Subsequently those values over $L_5$ that are more than a selected value, for example, 0.1 mm, greater than this linear fitting are identified, corresponding to segment 26 of the curve in FIG. 12. With these values, a new linear fit (using the Z positions and the errors) may be performed and the zero abscissa may be calculated. This value may be taken as the upper limit for the full thread length as shown in FIG. 12. Further analysis can be done using the non-machined part of the pipe shown in FIG. 12.

These values correspond to the pipe with a "virgin" surface and can provide information on the position of the thread with respect to the pipe at the moment of machining the part. For example, if the lathe has its plate misaligned, the thread will be off-axis with respect to the pipe, or if the pipe has a hook end the pipe and thread axis will not be parallel. Those variables can be easily calculated by finding the transformation between the pipe and the thread coordinate systems.

Figure 13:
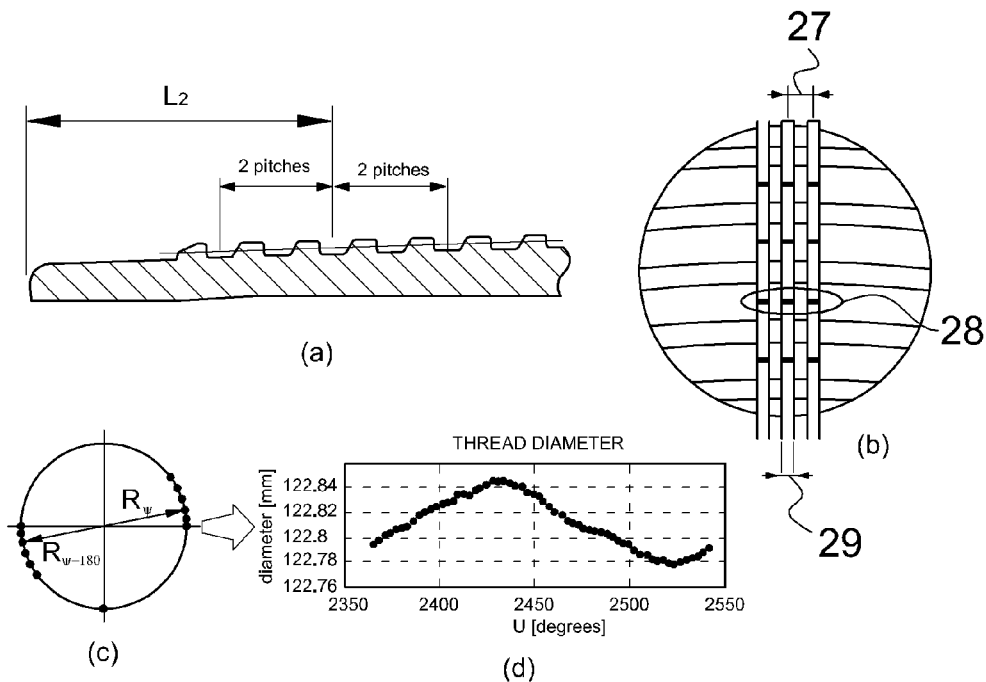
FIG. 13 is a schematic illustration of a thread on which an embodiment of the disclosed measurement device may be employed.

In a further embodiment, another data analysis operation may relate to calculation of thread diameter and ovality. Thread diameter and ovality may be evaluated in two ways using the root spiral scan. The data being analyzed may be those comprised in the zone corresponding to $L_2 \pm 2$ thread pitches. Root points defined in this zone are illustrated in. FIG. 13(a), which shows the thread lateral view in section, are linearly fitted, after which this fitted linear function may be evaluated to obtain the radius.

Alternatively, root points for each radius determination may be performed on generatrices equally spaced, advantageously at angular distances 27. In an embodiment, the spacing may be approximately three degrees. On each generatrix, data for each root may be averaged considering a selected generatrix width 29. For example, the width may be about 5 degrees. FIG. 13(b) illustrates a thread top view. This implementation may be similar to the mill procedure used with the MRP gauge.

Radii of defined points, illustrated in circle 28 of FIG. 13(b), may be calculated for generatrices ranging from about 0 to 180 degrees, with steps of about 3°, together with the opposite generatrices for diameter calculation as shown in FIG. 13(c), illustrating a thread frontal view. Successively thread diameter and ovality may be calculated by Equations [3] and [4]:

$$\text{Diameter} = (D_{max} + D_{min})/2 \quad [3]$$

$$\text{Ovality} = (D_{max} - D_{min})/2 \quad [4]$$

where $D_{max}$ and $D_{min}$ are the maximum and minimum diameters calculated through this process respectively. The results are shown in the FIG. 13(d).

Figure 14:
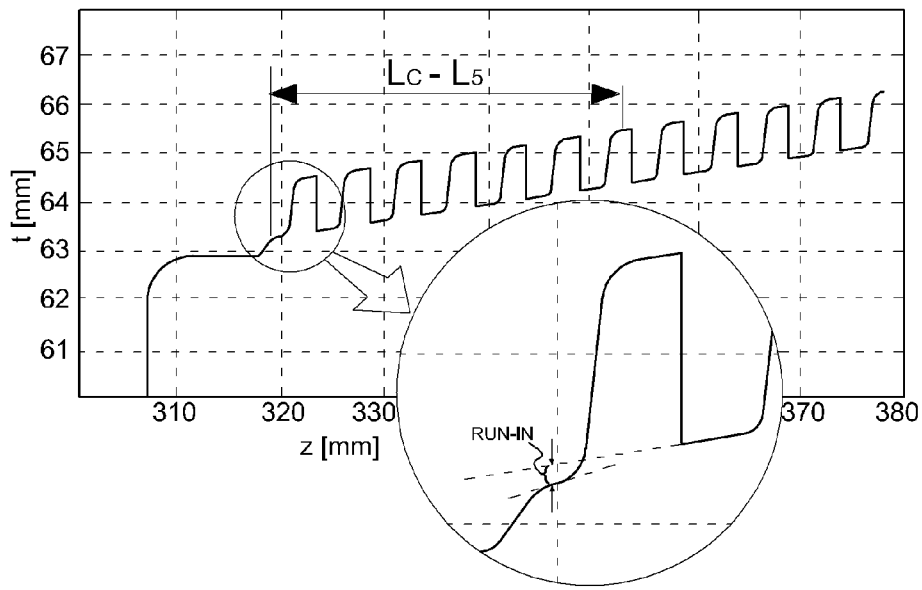
FIG. 14 is a graph showing results of thread run-in scans.

Another operation in the data analysis procedure may include a run-in evaluation. This evaluation may be derived from a longitudinal scan done in respect of the thread reference frame. FIG. 14 illustrates one of these scans which details the region in which the run-in is calculated.

First, a linear fit may be performed with unfiltered root data points between $L_5$+pitch and $L_c$. This fitted line may be compared with the root data included in the segment defined by $R_v$ and $R_{v2}$ as shown in FIG. 5 and referred to $L_5$. A linear fit may be performed over the error array resulting from that comparison. Then, the difference between this fitting, evaluated at the root mid segment value, and the previous fitting may be defined as the run-in value.

Subsequently a run-out analysis may be carried out in a similar manner to the operation performed for the run-in.

Yet another operation may be a pitch determination where the load flanks generated from the longitudinal scans are analysed.

The vectors containing the load flank values for each longitudinal scan may be truncated so as to keep the flanks between $L_5$+pitch and $L_c$. Of these flanks just the flanks of type 0 are accepted. The remainder of the types may be discarded, being considered unreliable as real load flank identifications.

Figure 15:
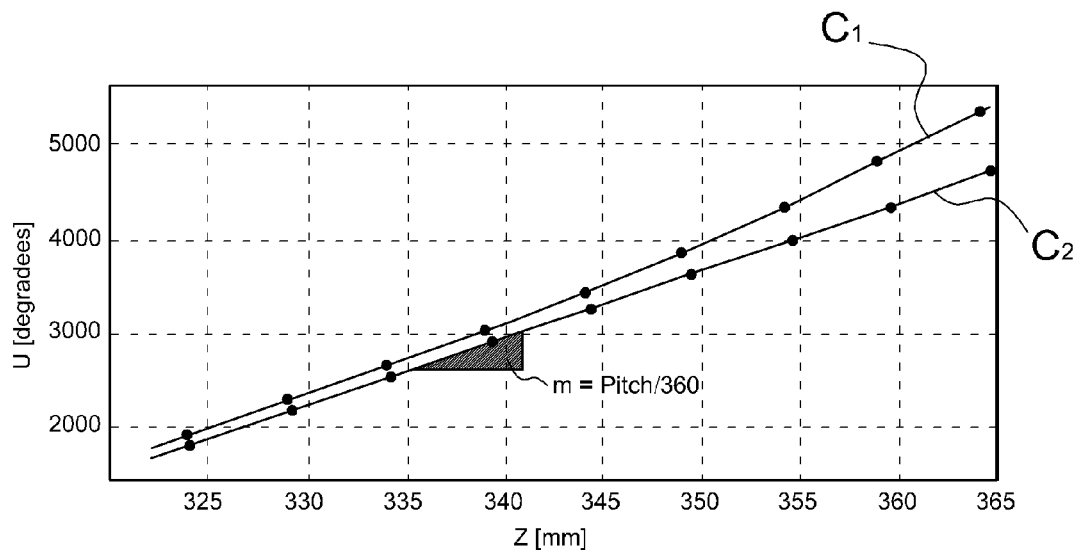
FIG. 15 is a graph showing results provided by an embodiment of the measurement device.

FIG. 15 illustrates a hypothetical longitudinal scan and the positions of the load flanks identified. The curve $C_1$ is an example illustrating how a longitudinal scan may be expressed in a measurement device reference frame where the effect of misalignment may be noticed in the curvature (quadratic form) of the flank position trend, due to "falling-off" of the thread generatrix. This effect may be also visible in the increasing separation between flank positions as the Z scan position grows.

To calculate the thread pitch, it is preferable that the data is transformed to the thread reference frame, indicated by $C_2$ in the figure. Data expressed in that frame have a linear trend where flank positions may not be equally spaced but the slope of the linear fit is the thread pitch.

There may be two types of pitch that are calculated and obtained by embodiments of the disclosed method:
  A first pitch calculated from the slope of the linear fit for all the flanks detected.
  A second pitch calculated from the slope of the line formed by two flanks whose separation depends on the thread being analysed (this measurement is preferably performed in relation to the number of threads per inch).

It may be appreciated that the data obtained gives information on the pitch for each longitudinal scan.

The measurement method of the present disclosure may be particularly advantageous for measuring threads having a wedge profile (i.e. a profile that has a progressive increase in tooth width). In further embodiments, the disclosed embodiments may be suitable for threaded objects having a wedge profile may be combined to a dove-tail shaped tooth profile in an axial section.

In the case of a wedge thread with a dove-tail tooth profile, the measurement of crests and roots provides for a spiral scan as described above. The spiral trajectory may follow a line corresponding to the middle position set along the middle distance between the load and stabbing flanks or any other spiral trajectory parallel to said middle position.

In state-of-the-art methods the measuring and controlling of wedge threads, measurements are taken from a reference point that may be conventionally called bolt point. The bolt point may be defined by passing a bolt, i.e. a measurement element having a small rolling ball of predetermined diameter, along the roots and setting the point where the bolt remains stuck in the root, because the tooth width may be variable along the thread. The distance and generatrix at which the bolt point may be located with respect to the front of the tube determine the reference point for measuring all parameters of a wedge thread.

According to the measurement method of the present disclosure this operation of setting the bolt point does not need to be performed because the threading parameters may be measured from a reference point that may be located at the end of the tube.

The determination of this point may be based on detecting all load and stabbing flanks in the spatial reference system of the measurement device (X, Y, Z) and then express them in the spatial reference system (X', Y', Z') of the pin using the axes transformation matrix to convert all data retrieved from one spatial reference system to the other spatial reference system, as described above.

Once the flanks positions are expressed in the spatial reference system (X', Y', Z') of the pin, a linear fit may be performed on the "Zr-Ur" plane where Zr is the axial position of the flank and Ur is the flank generatrix. This linear fitting may be performed for all load and stabbing flanks of the threading separately.

Finally, a subtraction may be performed between the two lines adjusted, described in the previous paragraph, and obtaining the "root width" for the whole thread and look for the value (Zr-Ur) of "root valley" where the bolt may be stuck in the root for a wedge effect.

The measurement method of the present disclosure for a wedge profile includes also a "Higbee" measurement. The Higbee may be understood by one of skill in the art as the cut of the first incomplete thread adjacent to the bevel made at the nose of the pin where its intersection with the thread load flank makes a sharp edge. The Higbee may correspond to the removal of the incomplete starting thread (of many types of thread, not only wedge) on tube end, with outer diameter OD≥5 in. The Higbee may remove the starting thread from where thread height is zero, until the thread crest starts, i.e. until where the thread height reaches the acceptance value, and the intersection between the Higbee and the crest of the thread defines a line, parallel to the taper. The arc length of the Higbee may be approximately 180°.

Higbee length and height may be configured so as to meet fabrication tolerances, and depend on the OD and type of connection. Higbee height can be about 0, this is to say that the machining tool can reach the root of the thread.

Figure 17:
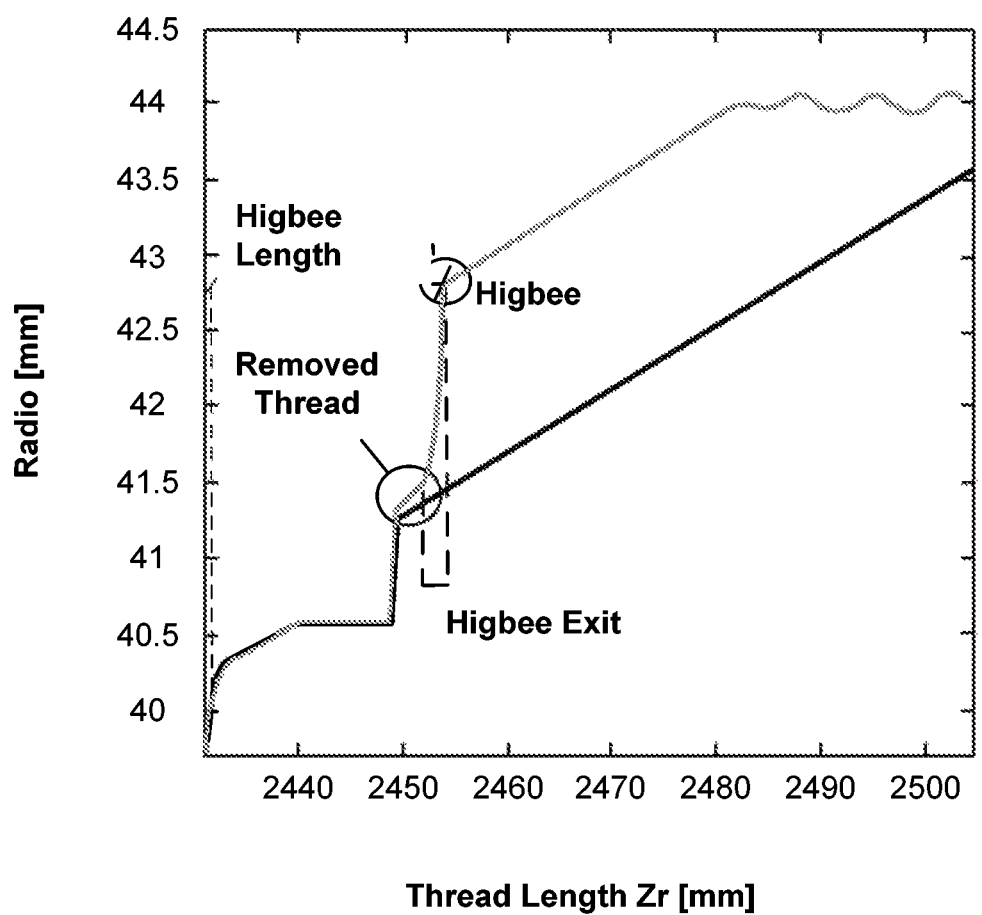
FIG. 17 is a graph illustrating results of another thread scan.

The Higbee point detection may be made by adjusting data retrieved from the spiral scan performed on the crest of threading and fitting it to a line and then eliminating all points from the line that are in an area close to the Higbee, when the error between the fitted line and data may be greater than some threshold. This point may be shown in the graph of FIG. 17.

The order in which the operations described above are made can vary as well as the number of operations, depending on the necessities and on the parameters to be measured. The completeness of the measurement operation may also provide for a calibration of the measurement device before starting operation of the system after set up.

Figure 16:
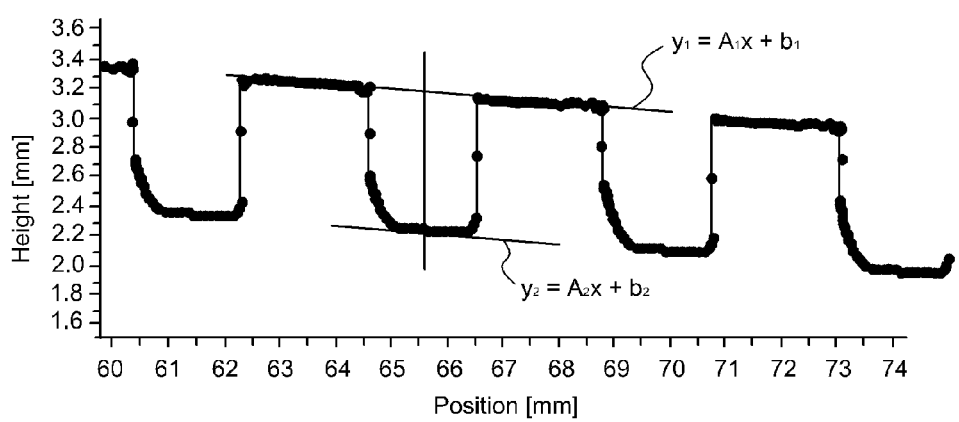
FIG. 16 illustrates a step height calculation on a thread using a linear fitting of crests and roots.

The data points obtained in the longitudinal scan can be further analyzed to obtain the value of the step height. Data close to the edges may be discarded and a linear fit between consecutive crests may be performed, as illustrated in FIG. 16. The fit may be compared to the linear fit of the root and its depth may be evaluated by calculating the distance between the line $y_2$ at the center of the root. A similar procedure may be performed to calculate the height of the crests, taking y1 as the center of the crest. From the depth and height of the roots and crests, the average and standard deviation are calculated, the incomplete steps are identified and the length of the thread estimated.

In another embodiment, another way to calculate the step height, in this case in a global manner, is to subtract a linear fit obtained from the crest and root spiral trajectories. This gives the difference between the inner and outer cones that represents the value of the step height. All variants of the measurement method above described can be carried out by means of the device according to the present disclosure and can also be applied to a pin after a coating operation and to a pin before coating.

A clear advantage of embodiments of the disclosed measurement device over the state of the art is that the sensors can describe any predefined arbitrary trajectory. As it is has been explained in the description, this may be achieved by use of linear and spiral scanners. These scanners may be used to build the matrix to convert retrieved data from one spatial reference system of the measurement device to the other spatial reference system of the measured element. Further, owing to this feature, embodiments of the measurement device may be able to perform absolute measurements regardless of any misalignment existing between the threaded tube and the measurement device.

In some embodiments, a measurement device according to the present disclosure achieves several advantages:
  When an embodiment of the measurement device is employed on threaded joints, it may provide measurements which are precise and performed automatically.
  Embodiments of the measurement device may perform non destructive measurements, as there is no contact between the surface and the measuring instrument. The likelihood of damaging the coating layer when the surface is coated during the measurement operation is significantly reduced, because of the use in the device of non-contact sensors, like laser or other similar optical sensors sensors.
  Embodiments of the measurement device may allow acquisition of quantitative information about one or more of thread characteristics, e.g. taper, seal diameter and ovality, run-in, run-out, thread diameter and ovality, pitch along a plurality of generatrices of the tube, and step height,
  Embodiments of the measurement device may allow absolute measurements to be performed on several threading parameters and tube features regardless of any misalignment between the threaded tube and the measurement apparatus, Embodiments of the measurement device may be precisely locate the pipe or object to be measured in the space owing to the series of scanning and fitting steps performed, regardless of its position and alignment with respect to the measurement device.

It may be appreciated that during measuring operations employing embodiments of the disclosed measurement systems and methods, the thread frame of reference may be detected independently of the position that the threaded object has in respect of the device and independently of the fact that the surface is coated or uncoated. This ability allows following the same trajectory when performing the measurement process before and after the coating operation.

Therefore, not only the geometrical parameters of threaded objects with or without a coating can be measured according to the disclosed embodiments, but the quality of the coating deposition process can also be verified and assessed.

Processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware, or a combination thereof.

Conditional language such as, among others, "can," "could," "might," or "may," unless specifically stated otherwise, are otherwise understood within the context as used in general to convey that certain embodiments include, while other embodiments do not include certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

Although the foregoing description has shown, described, and pointed out the fundamental novel features of the present teachings, it will be understood that various omissions, substitutions, and changes in the form of the detail of the apparatus and method as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A measurement device for measuring thread parameters of a threaded object, comprising:
at least one internal position sensor disposed on a distal end of a translatable and rotatable support for guiding a position of the at least one internal position sensor using a computing device, wherein the support extends at least partially into an inner channel of the threaded object in a direction of an axis and is configured to rotate around the axis, and wherein the computing device and the at least one internal position sensor are configured to acquire and output an internal shape of the threaded object as a first output signal;
at least two external position sensors disposed on a translatable and rotatable yoke, wherein the yoke is configured to rotate around the axis for guiding a position of the at least two external position sensors using the computing device, and wherein the computing device and the at least two external position sensors are configured to acquire and output an external shape of the threaded object as a second output signal; and
an encoder in communication with the computing device configured to compensate for lateral or angular misalignment of the threaded object and provide an alignment compensated internal shape of the threaded object surface from the first output signal and an alignment compensated external shape of the threaded object from the second output signal;
wherein the computing device and the at least one internal position sensor are configured to:
perform a first data acquisition of the internal shape of the threaded object at a first position to create a first coordinate axes (X-Y-Z) of the threaded object; and
perform a second data acquisition of the internal shape of the threaded object at a second position different from the first position to create a second coordinate axes (X', Y', Z') of the at least one internal sensor and to create the first output signal;
wherein the encoder is configured to synchronize the first coordinate axes with the second coordinate axes to compensate for the lateral or angular misalignment of the threaded object between the first position and the second position and provide the alignment compensated internal shape of the threaded object.

2. The measurement device of claim 1, wherein the at least one internal position sensor is a laser.

3. The measurement device of claim 1, wherein the internal shape is an internal threaded surface of a box, and wherein the at least one internal position sensor is configured to fit inside the box without interfering or touching the internal surface of the box.

4. The measurement device of claim 1, wherein the support is configured to guide the at least one internal position sensor during determination of the internal shape of the threaded object along a selected trajectory including selected measurement points.

5. The measurement device of claim 1, wherein the at least two external position sensors are located approximately 180° apart.

6. The measurement device of claim 1, wherein the measurement device is configured to measure a threaded surface of a box or pin, and wherein the box or pin is aligned in the direction of the axis.

7. The measurement device of claim 1, wherein the computing device and the at least two external position sensors are configured to:
perform a third data acquisition of the external shape of the threaded object at the first position to create a third coordinate axes (X-Y-Z) of the threaded object; and
perform a fourth data acquisition of the external shape of the threaded object at the second position to create a fourth coordinate axes (X', Y', Z') of the at least two external position sensors and to create the second output signal;
wherein the encoder is configured to synchronize the third coordinate axes with the fourth coordinate axes to compensate for the lateral or angular misalignment of the threaded object between the first position and the second position and provide the alignment compensated external shape of the threaded object.

8. A measurement device for measuring thread parameters of a threaded object, comprising:
at least one internal position sensor disposed on a distal end of a translatable and rotatable support for guiding a position of the at least one internal position sensor using a computing device, wherein the support extends at least partially into an inner channel of the threaded object in a direction of an axis and is configured to rotate around the axis, and wherein the computing device and the at least one internal position sensor are configured to acquire and output an internal shape of the threaded object as an output signal; and
an encoder in communication with the computing device configured to compensate for lateral or angular misalignment of the threaded object and provide an alignment compensated internal shape of the threaded object surface from the output signal;
wherein the computing device and the at least one internal position sensor are configured to:
perform a first data acquisition of the internal shape of the threaded object at a first position to create a first coordinate axes (X-Y-Z) of the threaded object; and
perform a second data acquisition of the internal shape of the threaded object at a second position different from the first position to create a second coordinate axes (X', Y', Z') of the at least one internal sensor and to create the output signal;
wherein the encoder is configured to synchronize the first coordinate axes with the second coordinate axes to compensate for the lateral or angular misalignment of the threaded object between the first position and the second position and provide the alignment compensated internal shape of the threaded object.

9. The measurement device of claim 8, wherein the at least one internal position sensor is a laser.

10. The measurement device of claim 8, wherein the internal shape is an internal threaded surface of a box, and wherein the at least one internal position sensor is configured to fit inside the box without interfering or touching the internal surface of the box.

11. The measurement device of claim 8, wherein the support is configured to guide the at least one internal position sensor during determination of the internal shape of the threaded object along a selected trajectory including selected measurement points.

12. The measurement device of claim 8, wherein the measurement device is configured to measure a threaded surface of a box, and wherein the box is aligned in the direction of the axis.

13. A measurement device for measuring thread parameters of a threaded object, comprising:
at least one external position sensor disposed on a translatable and rotatable yoke for guiding a position of the at least one external position sensor using a computing device wherein the yoke is configured to rotate around an external surface of the threaded object, and wherein the computing device and the at least one external position sensor are configured to acquire and output an external shape of the threaded object as an output signal; and
an encoder in communication with the computing device configured to compensate for lateral or angular misalignment of the threaded object and provide an alignment compensated external shape of the threaded object surface from the output signal;
wherein the computing device and the at least one external position sensor are configured to:
perform a first data acquisition of the external shape of the threaded object at a first position to create a first coordinate axes (X-Y-Z) of the threaded object; and
perform a second data acquisition of the external shape of the threaded object at a second position different than the first position to create a second coordinate axes (X', Y', Z') of the at least one external position sensor and to create the output signal;
wherein the encoder is configured to synchronize the first coordinate axes with the second coordinate axes to compensate for the lateral or angular misalignment of the threaded object between the first position and the second position and provide the alignment compensated external shape of the threaded object.

14. The measurement device of claim 13, wherein the at least one external position sensor is a laser.

15. The measurement device of claim 13, wherein the measurement device comprises at least two external position sensors.

16. The measurement device of claim 15, wherein the at least two external position sensors are located approximately 180° apart.

17. The measurement device of claim 13, wherein the measurement device is configured to measure a threaded surface of a pin.

* * * * *